US005985012A

United States Patent [19]

Nakamura et al.

[11] Patent Number: 5,985,012

[45] Date of Patent: Nov. 16, 1999

[54] RESIN CONTAINING AMINE BONDED THERETO AND ANTIFOULING PAINT

[75] Inventors: Isao Nakamura, Uji; Naoki Yamamori, Tsuzuki-gun, both of Japan

[73] Assignee: Nippon Paint Co., Ltd., Osaka, Japan

[21] Appl. No.: 09/029,827

[22] PCT Filed: Sep. 26, 1996

[86] PCT No.: PCT/JP96/02554

§ 371 Date: Mar. 9, 1998

§ 102(e) Date: Mar. 9, 1998

[87] PCT Pub. No.: WO97/09357

PCT Pub. Date: Mar. 13, 1997

[30] Foreign Application Priority Data

Sep. 8, 1995 [JP] Japan .................................... 7-256930

[51] Int. Cl.[6] ............................ C09D 5/14; A01N 25/00; A01N 25/02

[52] U.S. Cl. .................................... 106/15.05; 106/18.32; 106/18.33; 106/18.34; 106/18.35; 106/18.36; 424/78.09; 523/122; 523/177

[58] Field of Search .............................. 106/15.05, 18.32, 106/18.33, 18.34, 18.35, 18.36; 523/122, 177; 424/78.09

[56] References Cited

PUBLICATIONS

WPIDS Abstract No. 88–068423, abstract of Japanese Patent Specification No. 63–023906, Feb. 1988.

*Primary Examiner*—Anthony Green
*Attorney, Agent, or Firm*—Millen, White, Zelano & Branigan, P.C.

[57] ABSTRACT

As vehicle resin for antifouling paints, a vinyl polymer having a plurality of primary amine-bound pendant groups formed by the dehydration-condensation reaction of carbonyl group with the primary amine is used. The film of an antifouling paint containing this vehicle resin gradually release a primary amine exhibiting antifouling activity upon hydrolysis with sea water, while the film gradually dissolves from the surface.

17 Claims, No Drawings

RESIN CONTAINING AMINE BONDED THERETO AND ANTIFOULING PAINT

BACKGROUND ART

This invention relates to a hydrolyzable resin for use as a vehicle resin of antifouling paints as well as antifouling paints containing said resin.

Antifouling paints containing as a vehicle resin a trialkyltin-containing polymer are known. These resins are advantageous in controlling the release of antifouling agent to a minimum level sufficient to maintain desired antifouling effect at a constant level for a long period of time. In application, the vehicle resin consisting of a trialkyltin-containing polymer is hydrolyzed by the action of weakly alkaline sea water to release the trialkyltin, and at the same time the resin becomes water-soluble so that the paint film is consumed and smoothed. This contributes to the reduction of the frictional resistance of ships against water and, therefore, to the reduction of fuel cost.

The vehicle resins of this type of paints, known as "self-polishing paints", typically consist of copolymers of trialkyltin (meth)acrylate. However, strong concern about the toxic effect of trialkyltin on the ecological system has led to a demand for a new vehicle resin of self-polishing antifouling paints which may replace the trialkyltin-containing polymers.

Most of vehicle resins for self-polishing paints known in the prior art release a metal compound or ion. Recently we have found that some primary amines such as aniline or derivatives thereof exhibit an antifouling activity on a variety of aquatic organisms adhering to ships.

It is, therefore, a principal object of the invention to provide a new type of vehicle resins for use in antifouling paint which release upon hydrolysis an antifouling primary amine in a controlled manner while the remaining hydrolyzed resin is gradually consumed by dissolving in water.

SUMMARY OF THE INVENTION

It is well-known in the organic chemistry that a primary amine reacts with an aldehyde to form a Schiff base and also with a ketone to form a ketimine.

The present invention utilizes these reactions for combining a primary amine to the vehicle resin in a hydrolyzable form.

According to the invention, there is provided a vehicle resin used for antifouling paints comprising a primary amine-bound vinyl polymer which is produced by binding the primary amine to a carbonyl group-containing pendant group possessed by the corresponding vinyl polymer using the above dehydration-condensation reaction. Alternatively the primary amine-bound vinyl polymer may be produced by binding the primary amine to a carbonyl group-containing monomer using the above reaction and then copolymerizing the resulting monomer with other monomers copolymerizable therewith.

The present invention also provides an antifouling paint comprising the above vehicle resin.

In order to produce the primary amine-bound vinyl polymer of the present invention, it is necessary to start from a monomer having an aldehyde or ketone function. Typical examples of aldehyde monomers include acrolein, methacrolein, crotonaldehyde, cinnamaldehyde and 4-vinylbenzaldehyde. It is advantageous for easy handling and for preventing side reactions that such aldehyde monomers as acrolein which is volatile, irritative and unstable be used in the form of a cyclic acetal with ethylene glycol or 1,3-propanediol in the polymerization followed by regenerating the aldehyde function prior to the reaction with the primary amine. Examples of monomers having ketone function include N-(2-acetyl-1,1-dimethylethyl)acrylamide otherwise called diacetoneacrylamide.

The reaction of a primary amine with the aldehyde or ketone group can be performed either prior to or subsequent to the copolymerization of the aldehyde monomer or ketone monomer with other monomers.

Examples of copolymerizable monomers include alkyl (meth)acrylates such as methyl (meth)acrylate, ethyl (meth) acrylate, n-propyl (meth)acrylate, n-butyl (meth)acrylate, t-butyl (meth)acrylate or 2-ethylhexyl (meth)acrylate; and other mnomers such as styrene, $\alpha$-methylstyrene, vinyltoluene, (meth)acrylamide, (meth)acrylonitrile, vinyl acetate, vinyl propionate or vinyl chloride. A small proportion of hydroxyalkyl (meth)acrylates such as 2-hydroxyethyl (meth)acrylate or 2-hydroxypropyl (meth)acrylate may also be copolymerized. The polymerization may be carried out by the conventional solution polymerization method.

The condensation reaction of the aldehyde or ketone group with the primary amine may be performed on the polymer or on the monomer prior to the polymerization. Examples of usable primary amines for the purpose of the present invention include aromatic primary amines such as aniline, toluidine, xylidine, p-n-hexylaniline, p-n-octylaniline, p-nonylaniline or p-dodecylaniline; alicyclic primary amines such as cyclohexylamine; and aliphatic primary amines having 6 or more carbon atoms such as hexylamine, octylamine, decylamine, laurylamine, stearylamine or oleylamine. Aniline or substituted anilines, and alkylamines or alkenylamines having 8 to 20 carbon atoms are particularly preferable.

The vinyl polymers preferably have a number average molecular weight from 2,000 to 100,000, more preferably from 5,000 to 40,000. The molecular weight within the above range is necessary for maintaining an optimal balance among the film-forming property, workability and dissolution rate. The vinyl polymers preferably contain the primary amino groups bound to the aldehyde or ketone group at a concentration from 0.01 to 1.5 mol/100 g, more preferably from 0.1 to 1.0 mol/100 g.

The above-mentioned primary amines may be incorporated to the antifouling paint of the present invention as a discrete component. In this case, an aldehyde such as benzaldehyde or p-ethylbenzaldehyde may also be combined as a discrete component or in the form of Schiff base with the primary amine.

The primary amine-bound vinyl polymers may be incorporated into self-polishing antifouling paint formulations in combination with an antifouling agent and other conventional additives.

The antifouling paint composition according to the present invention may contain the following conventional additives.

(1) Antifouling Agent:

Powders or flakes of copper, zinc and nickel; oxides, hydroxides, halides or other salts of copper and zinc, particularly cuprous oxide or copper rhodanide; biocidal metal carboxylates such as copper naphthenate or copper stearate; metal (e.g. Na, K, Zn, Pb, Cu, Fe, Ni, Mg, Se) dithiocarbamates such as zinc dimethyldithiocarbamate, zinc bis-(dimethyldithiocarbamate) or zinc ethylenebis-dithiocarbamate; thiuram disulfides such as tetramethylthiurum disulfide; sulfamides such as phthalysulfathiazole, sulfaethyldole, sulfanilidopyridine, sulfamethoxyine or N,N'-dimethyl-N'-phenyl-N-fluorodichloromethylthiosulfamide; pyrrole and imidazole compounds such as glyodine, fentizole or polycide; thioxane and thioxathone compounds such as tetrazol, asterol or mylone; imide and amide compounds such as nicarbazin, 3,4,5-tribromosalicylanilide, N-trichloromethylmercaptophthalimide, 3,5-dinitrobenzamide, 2,4,6-trichloromaleimide or N-fluorodichloromethylthiophthalimide; sulfur- or halogen-containing organic compounds such as 2-methylthio-4-t-butylamino-6-cyclopropylamino-s-triazine, 2,4,5,6-tetrachlorophthalonitrile, N,N'-dimethyl-N-dichlorophenylurea, 4,5-dichloro-2-n-octyl-3-(2H) isothiazoline, 2-pyridinethiol-1-oxide zinc, 2,3,5,6-tetrachloro-4-methylsulfonyl-pyridine, 3-iode-2-propylbutylcarbamate or diiodomethyl p-tolylsulfone; and other known antifouling agents, pesticides, bacteriocides and fungicides.

(2) Plasticizer:

Phthalate plasticizers such as dioctyl phthalate, dimethyl phthalate or dicyclohexyl phthalate; aliphatic dicarboxylate plasticizers such as diisobutyl adipate or butyl sebacate; glycol ester plasticizers such as diethylene glycol dibenzoate or pentaerythritol alkanoic etser; phosphate plasticizers such as tricresyl phosphate or trichloroethyl phosphate; epoxy plasticizers such as epoxydized soybean oil or epoxydized octyl stearate; organotin plasticizers such as dioctyltin dilaurate or dibutyltin dilaurate; and other plasticizers such as trioctyl trimellitate or triacetin.

(3) Film Consumption Regulator:

Chlorinated paraffin, polyvinyl ether, polypropylene sebacate, partially hydrogenated terphenyl, polyvinyl acetate, polyalkyl (meth)acrylate, polyether polyol, alkyd resin, polyester resin, polyvinyl chloride, silicone oil, wax, vaseline and liquid paraffin.

(4) Pigment:

Extender pigments such as precipitated barium sulfate, talc, clay, chalk, silica white, alumina white or bentonite; color pigments such as titanium dioxide, zirconium dioxide, basic lead sulfate, tin oxide, carbon black, graphite, red iron oxide, chromium yellow, emerald green, phthalocyanine blue or quinacridone.

(5) Solvent:

Hydrocarbons such as xylene, toluene, ethylbenzene, cyclopentane, octane, heptane, cyclohexane or white spirit; ethers such as dioxane, tetrahydrofuran, ethylene glycol monomethyl ether, ethylene glycol monoethyl ether, ethylene glycol dimethyl ether, ethylene glycol monobutyl ether, ethylene glycol dibutyl ether, diethylene glycol monomethyl ether or diethylene glycol monoethyl ether; esters such as butyl acetate, propyl acetate, benzyl acetate, ethylene glycol monomethyl ether acetate or ethylene glycol monoethyl ether acetate; ketones such as methyl isobutyl ketone or ethyl isobutyl ketone; and alcohols such as n-butanol or propyl alcohol.

(6) Other additives:

Monobasic organic acids such as rosin, monobutyl phthalate or monooctyl succinate; camphor and castor oil.

The antifouling paint composition of the present invention may be prepared by the method known per se in the art. Any known machine such as ball mills, pebble mills, roll mills or sand grind mills may be used for mixing various ingredients.

Paint films of the antifouling paint of the present invention applied on ships, fish nets or marine structurals will be gradually hydrolyzed and disolved in the weakly alkaline atmosphere of sea water. It is believed that the dissolution mechanism of the paint films is such that, rather than the decomposition of the vehicle resin into a large number of small segment by hydrolysis, pendant groups are converted into a hydrophilic group upon hydrolysis until the concentration or density thereof reaches a threshold level at which the resin begins to dissolve. Accordingly, the antifouling paint of the present invention may produce, when applied onto ships, a film having excellent performance in terms of controlled antifouling effect for a long period of time. Thus, the antifouling paint of the invention finds use in ships such as tankers, ferry boats, fishing boats, steel boats, wood boats and FRP boats but also marine stracturals, fish nets and sea water conduits.

In the following production examples, examples and comparative examples, all parts and percents are by weight unless otherwise indicated.

EXAMPLES

Production of Vehicle Resin

Production Example 1

A flask equipped with a stirrer, nitrogen gas tube and drip funnel was charged with 95 parts of xylene and 13 parts of cinnamaldehyde and heated to an inner temperature of 90° C. To this was added dropwise a mixture of 67 parts of methyl methacrylate, 20 parts of n-butyl methacrylate and 1.5 parts of 2,2'-azobisisobutyronitrile over 4 hours. After 30 minutes, a mixture of 5 parts of n-butanol and 0.3 parts of 2,2'-azobisisobutyronitrile was added dropwise over 30 minutes and the reaction mixture maintained at the same temperature for 90 minutes. A varnish called "Varnish A" having an aldehyde concentration of 0.05 mol/100 g was obtained.

Production Example 2

The same flask as used in Production Example 1 was charged with 95 parts of xylene and 14 parts of methacrolein and heated to an inner temperature of 80° C. To this was added dropwise a mixture of 66 parts of methyl methacrylate, 20 parts of n-butyl methacrylate and 1.5 parts of 2,2'-azobisisobutyronitrile over 4 hours. After 30 minutes, a mixture of 5 parts of n-butanol and 0.3 parts of 2,2'-azobisisobutyronitrile was added dropwise over 30 minutes and the reaction mixture maintained at the same temperature for 90 minutes. Varnish B having analdehyde concentration of 0.1 mol/100 g was thus produced.

Production Example 3

The same flask as used in Production Example 1 was charged with 95 parts of xylene and 34 parts of diacetone-acrylamide and heated to an inner temperature of 80° C. To this was added dropwise a mixture of 46 parts of methyl methacrylate, 20 parts of n-butyl methacrylate and 1.5 parts of 2,2'-azobisisobutyronitrile over 4 hours. After 30 minutes, a mixture of 5 parts of n-butanol and 0.3 parts of 2,2'-azobisisobutyronitrile was added dropwise over 30 minutes and the reaction mixture maintained at the same temperature for 90 minutes. Varnish C having a ketone concentration of 0.1 mol/100 g was thus produced.

Production Example 4

The same flask as used in Production Example 1 was charged with 145 parts of xylene and 35 parts of crotonaldehyde. The flask content was initially kept at 0° C. Then 47 parts of aniline were added and allowed to react at 0° C. for 2 hours and then at 40° C. for additional 2 hours. Water formed by the reaction was distilled off in vacuo at about 250 Pa whereupon a monomer binding to primary amine was obtained.

Production Example 5

The same flask as used in Production Example 1 was charged with 35 parts of metahcrolein and maintained at 0° C. To this were added 100 parts of p-octylaniline and the mixture kept at 0° C. for 2 hours and then at 40° C. for 2 hours. Water produced by the reaction was distilled off in vacuo at about 250 Pa whereupon a monomer binding to primary amine was obtained.

Production Example 6

The same flask as used in Production Example 1 was charged with 95 parts of xylene and 20 parts of 2-vinyl-1,3-dioxorane (i.e. acrolein ethylene glycol acetal) and heated to an inner temperature of 80° C. To this was added dropwise a mixture of 46 parts of methyl methacrylate, 20 parts of styrene, 14 parts of n-butyl methacrylate and 1.4 parts of 2,2'-azobisisobutyronitrile over 5 hours. After 30 minutes, a mixture of 5 parts of xylene and 0.2 parts of 2,2'-azobisisobutyronitrile was added dropwise over 30 minutes and the reaction mixture maintained at the same temperature for 90 minutes. The reaction mixture was combined with 200 parts of 1 N hydrochloric acid and stirred at room temperature for 2 hours. Then organic phase was separated from aqueous phase, washed with deionized water twice, and distilled in vacuo at about 150 Pa to remove water with xylene azeotropically. 20 parts of xylene was added again to the residue whereupon Varnish D having an aldehyde concentration of 0.1 mol/100 g was obtained.

Production Example 7

The same flask as used in Production Example 1 was charged with 95 parts of xylene and 35 parts of 2-vinyl-4-methyl-1,3-dioxane (i.e. acrolein 1,3-propanediol acetal) and 25 parts of vinyl acetate, and inner temperature was kept at 90° C. To this was added dropwise a mixture of 30 parts of methyl methacrylate, 10 parts of 2-ethylhexyl acrylate and 1.5 parts of 2,2'-azobisisobutyronitrile over 5 hours. After 30 minutes, a mixture of 5 parts of xylene and 0.2 parts of 2,2'-azobisisobutyronitrile was added dropwise over 30 minutes and the reaction mixture maintained at the same temperature for 90 minutes. The reaction mixture was combined with 300 parts of 1 N hydrochloric acid and stirred at room temperature for 2 hours. Then organic phase separated from aqueous phase was washed with deionized water twice and distilled in vacuo at about 150 Pa to remove water with xylene azeotropically. 20 parts of xylene was added again to the residue whereupon Varnish E having an aldehyde concentration of 0.15 mol/100 g was obtained.

Production Example 8

The same flask as used in Production Example 1 was charged with 95 parts of xylene and maintained at 100° C. To this was added dropwise a mixture of 55 parts of the monomer produced in Production Example 4, 35 parts of methyl methacrylate, 10 parts of n-butyl acrylate and 1.3 parts of 2,2'-azobisisobutyronitrile over 4 hours. After 30 minutes, a mixture of 5 parts of xylene and 0.5 parts of 2,2'-azobisisobutyronitrile was added dropwise over 30 minutes and the reaction mixture maintained at the same temperature for additional 90 minutes to obtain Varnish F.

Production Example 9

The same flask as used in Production Example 1 was charged with 95 parts of xylene and maintained at 100° C. To this was added dropwise a mixture of 55 parts of the monomer produced in Production Example 5, 45 parts of methyl methacrylate and 1.3 parts of 2,2'-azobisisobutyronitrile over 4 hours. After 30 minutes, a mixture of 5 parts of xylene and 0.2 parts of 2,2'-azobisisobutyronitrile was added dropwise over 30 minutes and the reaction mixture maintained at the same temperature for additional 90 minutes to obtain Varnish G.

Production Example 10

A flask equipped with a stirrer, nitrogen gas tube and decanter was charged with 100 parts of Varnish A and 12 parts of p-decylaniline. This solution was refluxed at about 130° C. for 3 hours while distilling off water to produce Varnish H.

Production Example 11

Analogous to Production Example 10, Varnish I was obtained from 100 parts of Varnish B and 9 parts of aniline.

Production Example 12

Analogous to Production Example 10, Varnish J was obtained from 100 parts of Varnish B and 17 parts of dodecylamine.

Production Example 13

Analogous to Production Example 10, Varnish K was obtained from 100 parts of Varnish E and 43 parts of p-nonylaniline.

Production Example 14

Analogous to Production Example 10, Varnish L was obtained from 100 parts of Varnish C and 23 parts of p-decylaniline.

Production Example 15

Analogous to Production Example 10, Varnish M was obtained from 100 parts of Varnish D and 27 parts of oleylamine.

Production Example 16

Production Example 9 was followed except that a monomer mixture of 75 parts of 4-vinylbenzylideneaniline and 25 parts of methyl methacryalte was used. Varnish N was obtained.

Production Example 17

Production Example 9 was followed except that a monomer mixture of 85 parts of N-(4-vinylbenzylidene)-4-n-octylaniline and 15 parts of methyl methacryalte was used. Varnish O was obtained.

Production Example 18

Production Example 9 was followed except that a monomer mixture of 85 parts of a condensate of diacetoneacrylamide with laurylamine and 15 parts of methyl methacryalte was used. Varnish P was obtained.

Production Example 19

Production Example 9 was followed except that a monomer mixture of 80 parts of N-(4-vinylbenzylidene) laurylamine and 20 parts of methyl methacryalte was used. Varnish Q was obtained.

Paint Formulation

EXAMPLES 1–30 AND COMPARATIVE EXAMPLES 1–4

Materials shown in Tables 1–4 were thoroughly mixed in a disperser to obtain paints for testing.

TABLE 1

| Material, | EXAMPLE | | | | | | | | | | | |
|---|---|---|---|---|---|---|---|---|---|---|---|---|
| parts | 1 | 2 | 3 | 4 | 5 | 6 | 7 | 8 | 9 | 10 | 11 | 12 |
| Varnish F | 80 | | 65 | | | | | | | | | |
| Varnish G | | 75 | | 65 | | | | | | | | |
| Varnish H | | | | 70 | | | | | | 70 | | |
| Varnish I | | | | | 65 | | | | | | | |
| Varnish J | | | | | | 70 | 80 | | | | | |
| Varnish K | | | | | | | | 65 | | | 85 | |
| Varnish L | | | | | | | | | 65 | | | |
| Varnish M | | | | | | | | | | | | 80 |
| Cu phthalocyanine | | | | 7 | | 7 | 8 | | 7 | | 7 | 7 |

TABLE 1-continued

| Material, | EXAMPLE | | | | | | | | | | | |
|---|---|---|---|---|---|---|---|---|---|---|---|---|
| parts | 1 | 2 | 3 | 4 | 5 | 6 | 7 | 8 | 9 | 10 | 11 | 12 |
| red iron oxide | | | | | 8 | | | 8 | | 8 | | |
| $TiO_2$ | | | | 3 | 2 | | 2 | | | 3 | 2 | 2 |
| talc | | | | | | 3 | | 8 | | 3 | | |
| caprylaldehyde | | | | | | 12 | | | | | | |
| benzylidene-aniline | | | 25 | | | | 12 | | | | | 5 |
| octylaniline | | | | | 10 | | | | 15 | | | |
| colloidal silica | 3 | 4 | 4 | 3 | 4 | 4 | 3 | 4 | 4 | 3 | 3 | 3 |
| n-butanol | 3 | 5 | 6 | 3 | 4 | 4 | 4 | 3 | 4 | 3 | 3 | 3 |
| xylene | 14 | 16 | | 14 | 9 | | 3 | | 5 | 10 | | |

TABLE 2

| Material, | EXAMPLES | | | | | | | | | |
|---|---|---|---|---|---|---|---|---|---|---|
| parts | 13 | 14 | 15 | 16 | 17 | 18 | 19 | 20 | 21 | 22 |
| Varnish F | 45 | | | | | | | | | |
| Varnish G | | 35 | | | | | | 30 | | |
| Varnish H | | | 55 | | | | | | | |
| Varnish I | | | | 30 | | | | | 35 | |
| Varnish J | | | | | 40 | | 45 | | | |
| Varnish K | | | | | | 35 | | | | |
| Varnish L | | | | | | | | | | |
| Varnish M | | | | | | | | | | 50 |
| Cu phthalocyanine | 8 | | | | 8 | 7 | 8 | | | 7 |
| red iron oxide | | 6 | | 7 | | | | | | |
| $TiO_2$ | 7 | | 5 | | | 5 | 5 | 5 | 5 | |
| CuO | | 25 | 20 | 20 | 8 | | | 20 | 15 | |
| ZnO | 15 | 5 | 5 | | 7 | 15 | | 8 | 15 | 7 |
| talc | | 5 | 5 | 5 | 5 | 5 | 5 | 2 | 5 | 5 |
| others[1)–6)] | 5 | 3 | 3 | 5 | 3 | 2 | 5,3 | | | 3,3,2 |
| caprylaldehyde | | | 6 | | | | | | | |
| octylaniline | | | | 10 | | | 5 | | | |
| benzylideneaniline | | 5 | | | 8 | 8 | | | 2 | |
| DOP | 5 | 5 | | | 5 | 5 | 5 | 3 | 5 | 4 |
| colloidal silica | 3 | 3 | 3 | 4 | 4 | 4 | 4 | 3 | 3 | 4 |
| n-butanol | 3 | 3 | 3 | 5 | 4 | 4 | 3 | 4 | 3 | 4 |
| xylene | 9 | 5 | | 7 | 8 | 10 | 12 | 25 | 12 | 14 |

Remarks in Table 2:
[1)]2,4,6-trichlorophenylmaleimide in Ex. 16 and 18.
[2)]diiodomethyl p-tolyl sulfone in Ex. 15.
[3)]zinc 2-pyridinethiol-1-oxide in Ex. 13 and 17.
[4)]N,N'-dimethyldichlorophenylurea in Ex. 14
[5)]5 parts of 3) and 3 parts of 2) in Ex. 19.
[6)]3 parts of 3), 3 parts of 2) and 2 parts of 4) in Ex. 22.

TABLE 3

| Material, | EXAMPLE | | | | | | | |
|---|---|---|---|---|---|---|---|---|
| parts | 23 | 24 | 25 | 26 | 27 | 28 | 29 | 30 |
| Varnish N | 65 | | | | 45 | | | |
| Varnish O | | 55 | | | | 40 | | |
| Varnish P | | | 60 | | | | 35 | |
| Varnish Q | | | | 60 | | | | 40 |
| Cu phthalocyanine | 8 | 10 | 10 | 8 | | | | |
| CuO | | | | | 25 | 30 | 30 | 30 |
| red iron oxide | | | | | 5 | 7 | 6 | 5 |
| talc | 5 | 8 | 5 | 7 | 5 | 5 | 4 | |
| benzylideneaniline | 5 | 8 | 8 | 3 | | 3 | | |
| colloidal silica | 3 | 3 | 3 | 4 | 3 | 4 | 5 | 5 |
| n-butanol | 5 | 5 | 5 | 4 | 3 | 4 | 5 | 5 |
| xylene | 9 | 11 | 9 | 14 | 14 | 7 | 15 | 15 |

TABLE 4

| | COMPARATIVE EXAMPLES | | | |
|---|---|---|---|---|
| Material, parts | 1 | 2 | 3 | 4 |
| chlorinated rubber | 40 | 25 | 15 | |
| organotin copolymer[1)] | | | | 40 |
| $TiO_2$ | | 5 | 5 | 5 |
| CuO | | 15 | 20 | 15 |
| ZnO | | 5 | 5 | 5 |
| talc | | | | 5 |
| WW rosin | | 5 | 15 | |
| DOP | | 3 | 3 | 5 |
| colloidal silica | 3 | 3 | 4 | 3 |
| n-butanol | 2 | 3 | 3 | 3 |
| xylene | 55 | 34 | 30 | 19 |

[1)]tributyltin methacrylate(55)-methyl methacrylate (45) copolymer, 50% solution in xylene.

Antifouling Test

Coating composition of Examples 1–30 and Comparative Examples 1–4 were each applied on a steel plate (9×28 cm size) to a dry film thickness of about 150 microns. The substrate steel plate had been previously surface treated with sand blasting and then coated with a coaltar-epoxy primer.

Separately, Varnish F-Varnish Q were each applied on a polyvinyl chloride plate (9×28 cm size) to a dry film thickness of about 100 microns.

The resulting specimens were soaked in the sea near Research Laboratories of Nippon Paint Co. Ltd. at Tamano, Okayama, Japan. The antifouling property of these specimens were evaluated in terms of % fouled area with marine organisms with time. The results are shown in Table 5 and Table 6.

TABLE 5

| Antifouling Test | | | | | | | | |
|---|---|---|---|---|---|---|---|---|
| | Time, month | | | | | | | |
| Exam. | 1 | 3 | 6 | 12 | 18 | 24 | 30 | 36 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 5 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |
| 16 | 0 | 0 | 0 | 0 | 0 | 0 | 0 | 0 |
| 17 | 0 | 0 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |
| 20 | 0 | 0 | 0 | 0 | 0 | 0 | 0 | 0 |
| 21 | 0 | 0 | 0 | 0 | 0 | 0 | 0 | 0 |
| 22 | 0 | 0 | 0 | 0 | 0 | 0 | 0 | 0 |
| 23 | 0 | 0 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0 | 0 | 0 | 0 | 0 | 0 | 0 |
| 28 | 0 | 0 | 0 | 0 | 0 | 0 | 0 | 0 |
| 29 | 0 | 0 | 0 | 0 | 0 | 0 | 0 | 0 |
| 30 | 0 | 0 | 0 | 0 | 0 | 0 | 0 | 0 |
| Comp. 1 | 30 | 100 | 100 | 100 | 100 | 100 | 100 | 100 |
| Comp. 2 | 5 | 30 | 70 | 100 | 100 | 100 | 100 | 100 |

TABLE 5-continued

| Antifouling Test | | | | | | | | |
|---|---|---|---|---|---|---|---|---|
| | Time, month | | | | | | | |
| Exam. | 1 | 3 | 6 | 12 | 18 | 24 | 30 | 36 |
| Comp. 3 | 10 | 40 | 80 | 100 | 100 | 100 | 100 | 100 |
| Comp. 4 | 0 | 0 | 0 | 0 | 0 | 0 | 0 | 0 |

TABLE 6

| Antifouling Test | | | | | | | | |
|---|---|---|---|---|---|---|---|---|
| | Time, month | | | | | | | |
| Varnish | 1 | 3 | 6 | 12 | 18 | 24 | 39 | 36 |
| F | 0 | 0 | 0 | 0 | 0 | 0 | 0 | 0 |
| G | 0 | 0 | 0 | 0 | 0 | 0 | 0 | 0 |
| H | 0 | 0 | 0 | 0 | 0 | 0 | 0 | 5 |
| I | 0 | 0 | 0 | 0 | 0 | 0 | 0 | 0 |
| J | 0 | 0 | 0 | 0 | 0 | 0 | 0 | 0 |
| K | 0 | 0 | 0 | 0 | 0 | 0 | 0 | 0 |
| L | 0 | 0 | 0 | 0 | 0 | 0 | 10 | 20 |
| M | 0 | 0 | 0 | 0 | 0 | 0 | 0 | 5 |
| N | 0 | 0 | 0 | 0 | 0 | 0 | 0 | 0 |
| O | 0 | 0 | 0 | 0 | 0 | 0 | 0 | 0 |
| P | 0 | 0 | 0 | 0 | 0 | 0 | 0 | 0 |
| Q | 0 | 0 | 0 | 0 | 0 | 0 | 0 | 0 |

Film Comsumption Test

Coating compositions of Examples and Comparative Examples as well as Varnish F-Varnish Q were each applied on an acrylic resin disc having a diameter of 35 cm to a dry film thickness of about 100 microns. Then the coated discs were continuously rotated in the sea water at 18–23° C. for 12 months at a circumfential speed of 25 knots. The film consumption rate was evaluated in terms of the difference between the initial film thickness and the remaining film thickness with time. The results are shown in Table 7 and Table 8.

TABLE 7

| Film Consumption Test | | | | |
|---|---|---|---|---|
| | Consumed film thickness, μm | | | |
| Exam. | 1 mon. | 3 mon. | 6 mon. | 12 mon. |
| 1 | 12 | 26 | 42 | 68 |
| 2 | 8 | 19 | 32 | 58 |
| 3 | 10 | 22 | 34 | 50 |
| 4 | 5 | 12 | 21 | 34 |
| 5 | 14 | 22 | 41 | 75 |
| 6 | 12 | 24 | 38 | 62 |
| 7 | 13 | 22 | 37 | 60 |
| 8 | 11 | 22 | 35 | 55 |
| 9 | 10 | 18 | 25 | 48 |
| 10 | 14 | 24 | 45 | 67 |
| 11 | 11 | 21 | 37 | 58 |
| 12 | 15 | 24 | 44 | 65 |
| 13 | 13 | 22 | 32 | 52 |
| 14 | 11 | 19 | 28 | 44 |
| 15 | 13 | 24 | 42 | 60 |
| 16 | 8 | 14 | 23 | 34 |
| 17 | 12 | 20 | 32 | 51 |
| 18 | 9 | 16 | 27 | 43 |
| 19 | 12 | 19 | 33 | 56 |
| 20 | 11 | 19 | 31 | 55 |
| 21 | 16 | 26 | 44 | 71 |
| 22 | 18 | 30 | 48 | 78 |

TABLE 7-continued

| Film Consumption Test | | | | |
|---|---|---|---|---|
| | Consumed film thickness, μm | | | |
| Exam. | 1 mon. | 3 mon. | 6 mon. | 12 mon. |
| 23 | 8 | 18 | 28 | 48 |
| 24 | 10 | 19 | 32 | 49 |
| 25 | 10 | 21 | 38 | 55 |
| 26 | 12 | 19 | 35 | 65 |
| 27 | 10 | 20 | 36 | 52 |
| 28 | 12 | 28 | 42 | 64 |
| 29 | 10 | 20 | 31 | 55 |
| 30 | 11 | 19 | 34 | 58 |
| Comp. 1 | <5 | <5 | <5 | <5 |
| Comp. 2 | <5 | <5 | <5 | <5 |
| Comp. 3 | 5 | 20 | no film | |
| Comp. 4 | 12 | 22 | 38 | 69 |

TABLE 8

| Film Consumption Test | | | | |
|---|---|---|---|---|
| | Consumed film thickness, μm | | | |
| Varnish | 1 mon. | 3 mon. | 6 mon. | 12 mon. |
| F | 6 | 10 | 13 | 28 |
| G | 7 | 10 | 12 | 22 |
| H | <5 | 6 | 8 | 14 |
| I | 7 | 11 | 18 | 23 |
| J | 6 | 8 | 12 | 18 |
| K | 6 | 7 | 10 | 16 |
| L | 6 | 9 | 11 | 17 |
| M | 7 | 8 | 10 | 18 |
| N | 6 | 11 | 19 | 24 |
| O | 6 | 10 | 15 | 18 |
| P | 8 | 12 | 18 | 26 |
| Q | 6 | 10 | 18 | 23 |

The above test results demonstrate that the resin and antifouling paint of the present invention exhibited satisfactory self-polishing performance which is comparable to that of the organotin polymer-based paint of Comparative Example 4.

We claim:

1. A self-polishing antifouling paint comprising an antifouling agent and as a vehicle resin a vinyl polymer having a plurality of primary amine-carrying pendant groups, said primary amine being bound to said pendant groups by a dehydration-condensation reaction with a carbonyl group on the pendant groups.

2. The self-polishing antifouling paint of claim 1, wherein said primary amine is an aromatic primary amine.

3. The self-polishing antifouling paint of claim 2, wherein said aromatic primary amine is aniline, toluidine, xylidine, p-n-hexylaniline, p-n-octylaniline, p-nonylaniline or p-dodecylaniline.

4. The self-polishing antifouling paint of claim 1, wherein said primary amine is an aliphatic or alicyclic primary amine having 6 or more carbon atoms.

5. The self-polishing antifouling paint of claim 4, wherein the aliphatic or alicyclic primary amine is hexylamine, octylamine, decylamine, laurylamine, stearylamine, oleylamine or cyclohexylamine.

6. The self-polishing antifouling paint of claim 1, wherein said vinyl polymer having a plurality of primary amine-bound carbonyl groups is produced by reacting a primary amine with a vinyl polymer having a plurality of carbonyl group-containing pendant groups.

7. The self-polishing antifouling paint of claim 6, wherein said vinyl polymer having a plurality of carbonyl groups-containing pendant groups is a co-polymer of a monomer bearing an aldehyde or keto group and a vinyl monomer copolymerizable therewith.

8. The self-polishing antifouling paint of claim 7, wherein said monomer bearing an aldehyde or keto group is acrolein, methacrolein, crotonaldehyde, cinnamaldehyde, 4-vinylbenzaldehyde or N-(2-acetyl-1,1-dimethylethyl) acrylamide.

9. The self-polishing antifouling paint of claim 1, wherein said vinyl polymer having a plurality of primary amine-bound pendant groups is produced by copolymerizing a dehydration-condensation reaction product between a carbonyl group-containing monomer and a primary amine with a monomer copolymerizable therewith.

10. The self-polishing antifouling paint of claim 9, wherein said dehydration-condensation product is a Schiff base of an aldehyde group-containing monomer with the primary amine or a ketimine of a keto group-containing monomer with the primary amine.

11. The self-polishing antifouling paint of claim 10, wherein said aldehyde or keto group-containing monomer is acrolein, methacrolein, crotonaldehyde, cinnamaldehyde, 4-vinylbenzeldehyde or N-(2-acetyl-1,1-dimethylethyl) acrylamide.

12. The self-polishing antifouling paint of claim 1, wherein said vinyl polymer having a plurality of primary amine-bound pendant groups has a number average molecular weight of from 2,000 to 100,000.

13. The self-polishing antifouling paint of claim 1, wherein said vinyl polymer having a plurality of primary amine-bound pendant groups has an amine bound-carbonyl group concentration of from 0.01 to 1.5 mol/100 g.

14. The self-polishing antifouling paint of claim 1, wherein said antifouling agent is a powder or flake of copper, zinc or nickel; an oxide, hydroxide, halide or salt of copper or zinc; a biocidal metal carboxylate; a metal dithiocarbonate; a thiuram disulfide; a sulfamide; a pyrrole or imidazole compound; a thioxane or thioxathone compound; an imide or amide compound; or a sulfur- or halogen-containing organic compound.

15. The self-polishing antifouling paint of claim 1, wherein said antifouling agent is cuprous oxide, copper rhodanide, copper naphthenate, copper stearate, zinc dimethyldithiocarbamate, zinc bis (dimethyldithiocarbamate), zinc ethylenebisdithiocarbamate, tetramethylthiurum disulfide, phthalysulfathiazole,, sulfaethyldole, sulfanilidopyridine, sulfamethoxyine, N,N'-dimethyl-N'-phenyl-N-fluorodichloromethylthiosulfamide, glyodine, fentizole, polycide, tetrazole, asterol, mylone, nicarbazin, 3,4,5-tribromosalicylanilide, N-trichloromethyl-mercaptophthalimide, 3,5-dinitrobenzamide, 2,4,6-trichloromaleimide, N-fluorodichloromethylthiophthalimide, 2-methylthio-4-t-butylamino-6-cyclopropylamino-s-triazine, 2,4,5,6-tetrachlorophthalonitrile, N,N'-dimethyl-N-dichlorophenylurea, 4,5-dichloro-2-n-octyl-3-(2H) isothiazoline, 2-pyridinethiol-1-oxide zinc, 2,3,5,6-tetrachloro4-methylsulfonyl-pyridine, 3-iode-2-propylbutylcarbamate or diiodomethyl p-tolylsulfone.

16. The self-polishing antifouling paint of claim 1, wherein said antifouling agent is cuprous oxide or copper rhodanide.

17. A method for achieving an antifouling and self-polishing effect on a surface, comprising applying an antifouling paint of claim 1 to a surface, and exposing the surface to an environment where an antifouling and self-polishing effect is achieved.

* * * * *